W. H. SMITH.
VENTING DEVICE.
APPLICATION FILED DEC. 4, 1916.

1,242,613.

Patented Oct. 9, 1917.

Inventor
William H. Smith
By Hull, Smith, Brock, & West
Att'ys.

UNITED STATES PATENT OFFICE.

WILLIAM H. SMITH, OF CLEVELAND, OHIO.

VENTING DEVICE.

1,242,613. Specification of Letters Patent. Patented Oct. 9, 1917.

Application filed December 4, 1916. Serial No. 134,799.

*To all whom it may concern:*

Be it known that I, WILLIAM H. SMITH, a citizen of the United States, residing at Cleveland, in the county of Cuyahoga and State of Ohio, have invented a certain new and useful Improvement in Venting Devices, of which the following is a full, clear, and exact description, reference being had to the accompanying drawings.

This invention relates to vents and has for its object the provision of a closable vent together with means for preventing the loss of the said closure, the whole being of peculiarly cheap, simple and durable construction. In the present embodiment I have shown my improvements in connection with a valve of the type known in the trade as a "compression stop and waste valve", but it will be understood that my improvements are susceptible of use wherever vent devices are employed, and that the use of the same in connection with the valve constitutes only one embodiment of my invention.

Figure 1:
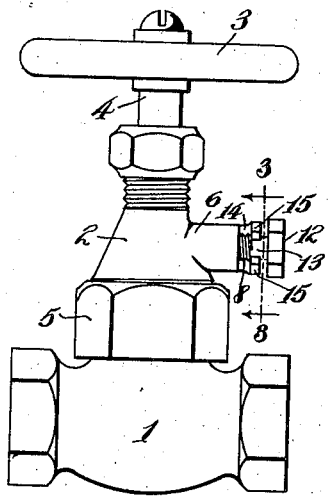
Figure 4:
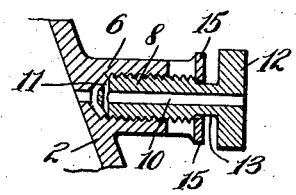
Figure 2:
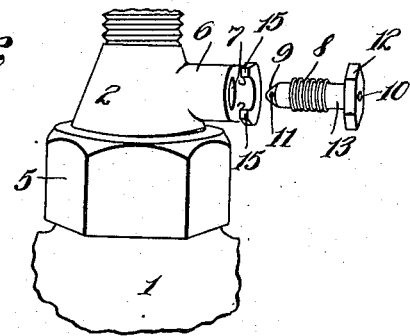
Figure 3:
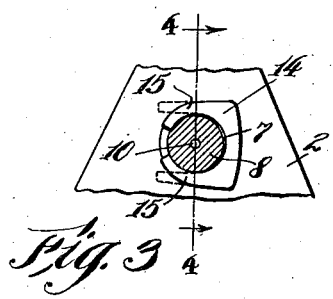

In the drawings accompanying and forming a part of this application Figure 1 represents a side elevation of a combined stop and waste valve equipped with my improved vent; Fig. 2 is a perspective of a portion of said valve showing the method of applying the vent plug; Fig. 3 is a detail sectional view on the line 3—3 of Fig. 1; and Fig. 4 is a sectional view through the vent itself.

Describing the parts by reference characters, 1 represents the body of a valve, 2 the bonnet, 3 the handle and 4 the stem, the body and bonnet being connected by means of a coupling nut 5. Projecting from the side of the bonnet is a branch 6 having a bore 7 communicating with the bonnet interior and internally threaded for the reception of a threaded plug 8. Said plug is formed with a conical tip 9 and with a longitudinal bore 10 which opens through the wall of the cone as shown at 11, the interior of the branch being so arranged that when the plug 8 is screwed to its seat the port 11 will be closed. The outer end of said plug is formed with an enlarged head 12 whereby it may be operated, and between said head and the beginning of the screw thread 8 there is formed a groove 13. Carried by one side of the branch 6 is the forward extension 14 formed with the two flexible ears or arms 15—15, which, when the device is first made, are spaced sufficiently apart to receive the plug 8 freely as shown in Fig. 2 and in dotted lines in Fig. 3, but possessing sufficient flexibility to permit them to be bent inwardly after the insertion of the plug to secure the same against accidental removal as shown in Fig. 1 and in full lines in Fig. 3. The width of the groove 13 is sufficiently greater than the width of the ears 15 to afford to the plug the necessary longitudinal movement for the opening and closing of the vent. Also the distance between the plug seat and the outer face of these ears will not be greater than the length of the plug for obvious reasons.

Most metals, such as brass or bronze, commonly employed in the construction of devices of this nature have sufficient flexibility to permit the necessary bending of these ears. It will be understood that many changes of construction could be made within the scope of my invention, and that my improvements are susceptible of use in a great many locations outside of the one here shown.

Having thus described my invention, what I claim is:—

1. In a device of the character described, the combination with a venting tube having a threaded bore and a valve seat therein, of a threaded plug received in said bore and having a seating portion adapted to engage said seat, said plug having a circumferential groove therein, and a flexible extension carried by said tube and having an inwardly bent portion engaging said groove and preventing the withdrawal of said plug.

2. In a device of the character described, the combination with a venting tube having a threaded bore and a valve seat therein, of a threaded plug received in said bore and having a seating portion adapted to engage said seat, said plug having a circumferential groove therein, and a flexible extension carried by said tube and having an inwardly bent portion engaging said groove and preventing the withdrawal of said plug, the width of said portion being less than that of the groove.

3. In a device of the character described the combination with a body member having a threaded bore, a movable valve member mounted in said bore, said valve member having a circumferential groove therein, and a flexible portion integral with said body member and extending circumferentially of said valve member and bent into said groove whereby the removal of said valve member is prevented.

4. In a device of the character described, a body member having an internally threaded longitudinal bore, an extension carried by said body and having a pair of spaced arms one on each side of the bore, said arms being also spaced slightly from the end of said body, a threaded plug adjustably screwed into said bore and having a circumferential groove upon the portion opposite said arms, said arms being bent inwardly so as to fall within said groove, the width of said groove being greater than the width of said arms.

5. In a device of the character described, a body member having a bore, an extension carried by said body and having a pair of spaced arms one on each side of the bore, said arms being also spaced slightly from the end of said body, and a rotatable plug in said bore and having a circumferential groove upon the portion opposite said arms, said arms being bent inwardly so as to fall within said groove said plug being arranged and adapted when moved within the limits fixed by said arms and groove to open and close the passage through said bore.

6. In a combined stop and waste valve, a body, a bonnet for said body, a hollow internally-threaded branch projecting from said bonnet, and a threaded plug in said branch, said plug having a circumferential groove and said branch having an extension formed with integral arms embracing said plug and bent into said groove, said plug also having valve provisions whereby said branch may be opened and closed by a movement of said plug within the limit set by said arms and groove.

7. In a combined stop and waste valve, a body, a bonnet for said body, a hollow branch carried by said bonnet, a rotatable plug in said branch, said plug having a circumferential groove and said branch having a flexible integral extension embracing said plug and bent into said groove; said plug also having valve provisions whereby said branch may be opened and closed by a movement of said plug within the limit set by said arm and groove.

8. In a device of the character described, the combination of a venting tube having a threaded bore and a valve seat therein, a threaded plug received in said bore and having on one end thereof a seating portion adapted to engage said seat, said plug also having an enlarged head on its other end, the portion of said plug intermediate said head and threaded portion of the plug being reduced in diameter, and said venting tube having on its outer end an integrally formed arm, which extends outwardly, and is adapted to be bent inwardly within the reduced portion of said plug, the width of said arm being less than that of the reduced portion of the plug, whereby in opening the valve the threaded portion of the plug engages said arm and prevents the removal of the plug from the bore.

In testimony whereof, I hereunto affix my signature.

WILLIAM H. SMITH.

Copies of this patent may be obtained for five cents each, by addressing the "Commissioner of Patents, Washington, D. C."